Aug. 29, 1933.     D. NICKERSON     1,924,747
APPARATUS FOR MEASURING COLOR
Filed Nov. 13, 1928
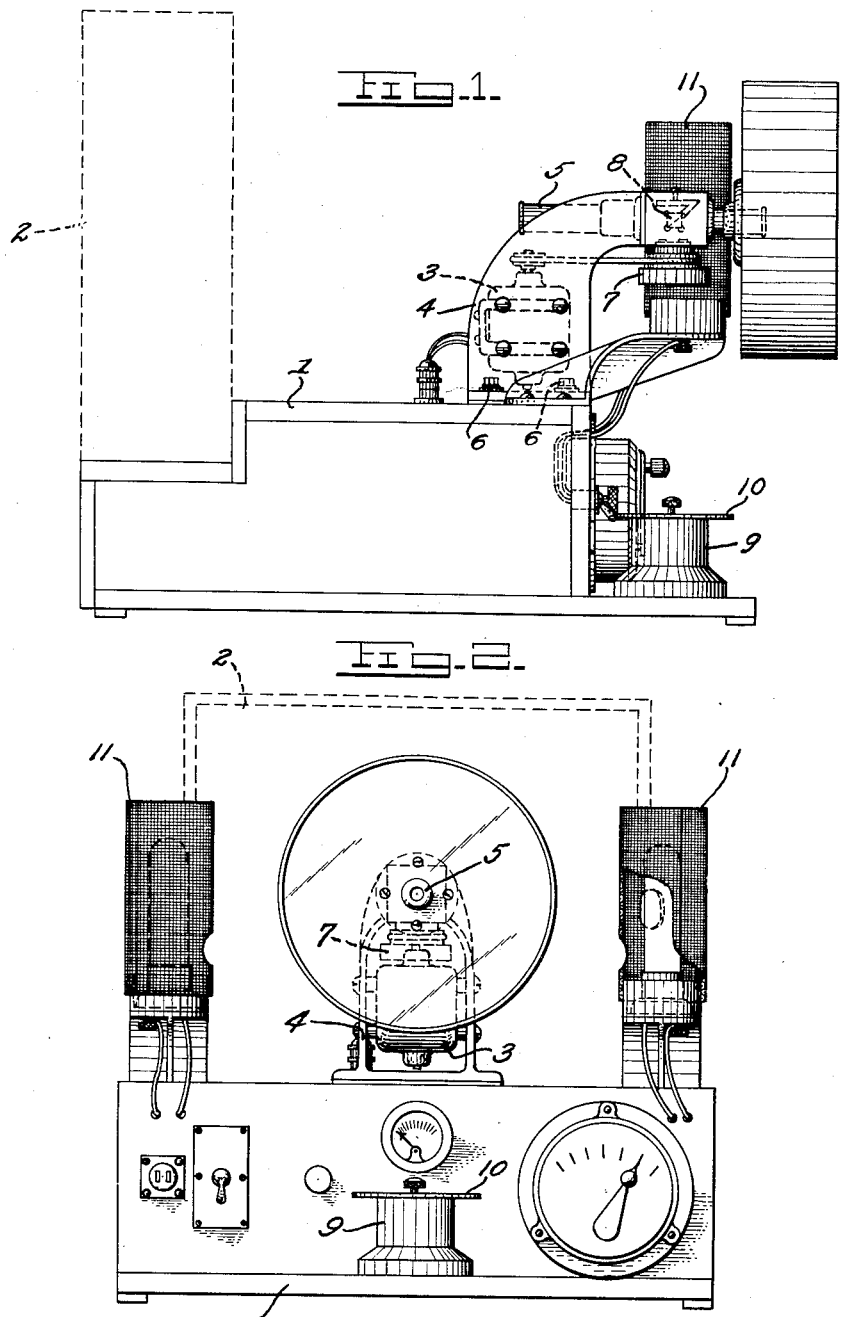
INVENTOR
DOROTHY NICKERSON
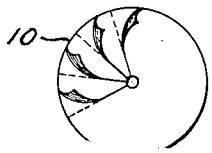
BY
ATTORNEY

Patented Aug. 29, 1933

1,924,747

UNITED STATES PATENT OFFICE 1,924,747

APPARATUS FOR MEASURING COLOR

Dorothy Nickerson, Washington, D. C.

Application November 13, 1928
Serial No. 319,158

1 Claim. (Cl. 88—14)

(Granted under the Act of March 3, 1883, as
amended April 30, 1928; 370 O. G. 757)

This application is made under the act approved April 30, 1928, and the invention herein described, may be manufactured and used by or for the Government for governmental purposes without payment to me of any royalty thereon.

My invention relates particularly to measurement of the color of raw cotton, or other substance containing foreign matter or otherwise presenting a non-uniform field for comparison with the standard, but it is evident that it may also be applied to objects presenting a uniform surface. The features peculiar to my invention are: means of viewing a large enough area of the variegated field to be fairly representative; means of rendering invisible the details of this field for better comparison; rapid means of synthesizing and analyzing the comparison field; and means of securing proper illumination of both fields.

The apparatus used in carrying out my invention is a peculiar form of colorimeter making use of the Maxwell color disks for the comparison field. These are peculiarly suited to my invention because by them the three fundamental units of color, hue, brilliance, and chroma may be given numerical expression. They are cut radially so that they may be screwed into each other and present a circular area composed of segments of different colors. The colorimeter contains also the well-known optical means of condensing a large enough field to be representative to a small enough field to be compared; an optical means of off-focusing to remove detail in the object; a method of integrating the segments of the discs into a uniform color; the usual photometric cube; a suitable method of illumination; and a holder for the object. I can accomplish my results by means of either the apparatus shown in the accompanying drawing which consists of an eyepiece, discs, a holder, and suitable lighting or by the apparatus shown in the drawing in which Figure 1 is side view of the colorimeter and object holder, Figure 2 a front view of the colorimeter and means of illumination, and Figure 3 a top view of the segmentable discs and scale for reading them. Similar letters refer to similar parts in all views. A more detailed description of my apparatus is as follows:

Base 1 has mounted at its rear sample holder 2. Motor 3 is mounted on bracket 4 which supports telescope assembly 5. Said bracket 4 is mounted on base 1 by means of bolts 6. Motor 3 rotates rhomb 7 mounted directly beneath cube 8 of telescope assembly 5. Stud 9 situated below rhomb 7 and mounted on base 1 carries color discs 10. Illuminating means 11 are mounted on the front of base 1 and are so positioned as to cast uncolored rays of equal light simultaneously on sample situated upon sample holder 2 and on color discs 10. The telescope assembly 5 is mounted on base 1 by means of bracket 4 and is so positioned as to permit simultaneous observance of discs 10 and sample on sample holder 2.

The effect of the rotation of the rhomb is to gather light from all parts of the irregular annular area presented by the segments of the sample, and lead it into the cube and into the eye. Light also comes from the discs into the telescope assembly and the eye. This light may come from a non-uniform field and must be off focused in order to remove the detail. The same train of lenses used in off focus may also be used to condense a large enough field of the object to be representative of its general character. The sample holder 2 is to limit the objective field to proper proportions.

The sources of light may be two lamps symmetrically placed with reference to both fields and preferably of about 5,000 K color temperature. They must be carefully adjusted so that there is an equilization of the amount and quality of light seen through the eyepiece from the sample and the discs.

I claim:

A colorimeter of the character described, the combination with a base, a sample holder mounted on the rear of said base, means for mounting color disks, having percentage graduations thereon, in operative relation to the sample holder, means for revolving said disks, illuminating means mounted on the front of the base and so positioned as to cast uncolored rays of equal light simultaneously on sample and on color disks, and a telescope assembly mounted on said base so positioned as to permit simultaneous observance of said disks and sample.

DOROTHY NICKERSON.